United States Patent
Roelens

(10) Patent No.: US 7,280,156 B2
(45) Date of Patent: Oct. 9, 2007

(54) PROCESS AND DEVICE FOR SYNCHRONIZING PRESENTATION OF AUDIO AND/OR VIDEO FRAMES

(75) Inventor: Frederic Roelens, Paris (FR)

(73) Assignee: STMicroelectronics SA, Montrouge (FR)

( * ) Notice: Subject to any disclaimer, the term of this patent is extended or adjusted under 35 U.S.C. 154(b) by 838 days.

(21) Appl. No.: 10/741,424

(22) Filed: Dec. 19, 2003

(65) Prior Publication Data

US 2005/0021811 A1 Jan. 27, 2005

(30) Foreign Application Priority Data

Dec. 20, 2002 (FR) .................................. 02 16329

(51) Int. Cl.
*H04N 9/475* (2006.01)
(52) U.S. Cl. ...................................... 348/512; 348/515
(58) Field of Classification Search ............... 348/500, 348/512, 515; 375/240.28, 354; 370/350, 370/503; *H04N 9/475*
See application file for complete search history.

(56) References Cited

U.S. PATENT DOCUMENTS 5,430,485 A * 7/1995 Lankford et al. ............ 348/515
7,176,978 B2 * 2/2007 Uchida et al. .............. 348/515

* cited by examiner

*Primary Examiner*—Sherrie Hsia
(74) *Attorney, Agent, or Firm*—Lisa K. Jorgenson; Stephen Bongini; Fleit Kain Gibbons Gutman Bongini & Bianco P.L.

(57) ABSTRACT

A method and device are provided for synchronizing the presentation of audio frames and/or of video frames comprises the detection of presentation time stamps in a stream of frames. The presentation instant indicated by a time stamp is compared with a time delivered by a local reference clock. Depending on a variance and on an average of values of deviation between presentation instants and corresponding times indicated by the clock, the clock can be initialized according to the presentation instant indicated by a time stamp or the presentation of the frames can be adjusted.

20 Claims, 3 Drawing Sheets

PROCESS AND DEVICE FOR SYNCHRONIZING PRESENTATION OF AUDIO AND/OR VIDEO FRAMES

CROSS-REFERENCE TO RELATED APPLICATIONS

This application is based upon and claims priority from French Patent Application No. 02-16329, filed Dec. 20, 2002, the entire disclosure of which is herein incorporated by reference.

BACKGROUND OF THE PRESENT INVENTION

The present invention relates to a process and a device for synchronizing the presentation of video frames and/or audio frames generated from a data stream comprising time stamps indicating instants of presentation of the frames. It applies more particularly to a compressed data stream read from a mass recording digital medium. The compressed data stream may be a data stream compressed according to the MPEG-2 standard (ISO/IEC 13812-2), hereinafter the MPEG standard.

The frames are produced by an MPEG decoder from an MPEG data stream broadcast live by a transmission source (broadcasting by satellite, broadcasting by cable or digital terrestrial broadcasting or DVB ("Digital Video Broadcasting")). They belong to an audiovisual program or to several audiovisual programs multiplexed in the data stream.

The frames are synchronized just before their presentation, with respect to a clock generated from the time references forwarded by the transmission source in the data stream. These time references are called "Program Clock References" or PCRS, in the MPEG standard. They are inserted into the MPEG data stream in synchronism with a clock which regulates the MPEG coding of the frames. They make it possible, with the aid of a PLL ("Phase Locked Loop") circuit or the like, to generate on the decoding side a reference clock tied to the program. This clock is called a program clock in what follows.

The data stream also comprises presentation time stamps indicating respective instants of presentation of the frames. These time stamps make it possible to synchronize the presentation of the frames with respect to the program clock. They are called "Presentation Time Stamps", or PTSs, in the MPEG standard. The decoding and the displaying of the frames are then performed by complying with the real-time constraints in such a way that the frames are presented at instants defined by the PTSs in relation to the program clock. Although the video decoding and the audio decoding are separate procedures, each video frame and each audio frame is synchronized with the program clock so that they are presented at one and the same determined instant. Stated otherwise, the video frames and the audio frames are each synchronized with the program clock and are also synchronized with one another.

When the data stream from which the frames are produced is not received in real time, but is read from a mass recording digital medium such as a hard disk or a DVD ("Digital Video Disk"), the concept of real time is lost. Specifically, even if the data stream stored on the medium in the form of an elementary stream (or ES) or a packetized elementary stream (or PES) still comprises the PCRs and the PTSs, the decoding procedure is carried out in a very different manner. Specifically, there is provision for much more considerable buffering than in the case of real-time decoding. Likewise, there is a large difference with regard to the supplying of the data. Specifically, the rate of supply of the data may be much higher and may be in burst mode. This results from the specific way in which the accesses to the hard disk are made with respect to the reading of portions of the data stream.

Moreover, the synchronization must be preserved during reading according to advanced modes of reading ("trick modes") such as fast forward and rewind, and when random accesses to the hard disk are required. Also, the synchronization must be preserved when passing from the presentation of a program received in real time to that of a program read on hard disk, or vice versa, or from the presentation of a first program to a second program read on a hard disk, or else during the insertion of an advertising or other sequence into the presentation of a program ("seamless splicing").

SUMMARY OF THE PRESENT INVENTION

A first aspect of the present invention relates to the synchronization of the presentation of video frames or audio frames, independently of one another. For the synchronization of the video, a preferred embodiment of the present invention includes analyzing a string of presentation time stamps present in the data stream and making the decision to skip or to repeat the presentation of frames (i.e., the displaying of images) according to the delay or the advance, respectively, with respect to a locally generated reference clock. For the audio synchronization, a preferred embodiment of the present invention includes a similar procedure, except that the advance is processed by the halting of the presentation of audio frames instead of their repetition.

A second aspect of the present invention relates to the synchronization of the video frames and the audio frames with one another (i.e., mutual synchronization).

One embodiment of the present invention provides a method for synchronizing the presentation of video frames and/or audio frames generated by processing a data stream comprising presentation time stamps (PTS) indicating instants of presentation of the frames, the processing of certain at least of the presentation time stamps comprising the following steps. There is calculated a current value of deviation between the presentation instant indicated by a time stamp undergoing processing and a time indicated by a local reference clock during the processing of the time stamp. The current value of deviation is stored in a register following values of deviation corresponding to previously processed time stamps. There is calculated a variance of an ordered set of deviation values stored in the register coming after a reference deviation value, the set of deviation values comprising at least the current value of deviation, and the variance is compared with a determined variance threshold. If the variance is greater than the variance threshold, the current value of deviation is selected as new value of reference deviation. Or, if the variance is less than the variance threshold, an average of the deviation values of the set of deviation values is calculated and the average is compared with a determined average threshold. If the absolute value of the average is greater than the average threshold, the reference clock is initialized to an instantaneous value corresponding to the presentation instant indicated by the time stamp undergoing processing and the current value of deviation is selected as new value of reference deviation. Or, if the absolute value of the average is less than the average threshold, the presentation of the frames is adjusted in such a way as to reduce the deviation between the presentation instant indicated by the time stamp undergoing processing and the time indicated by the local reference clock during the processing of the time stamp.

The method of this embodiment of the present invention therefore provides for the synchronization of the frames with respect to a reference clock, i.e. the local reference clock, which is not necessarily tied to the PCRs contained in the stream. It may then in particular be used for the presentation of video frames and/or audio frames generated by a video/audio decoder from a data stream read on a recording medium, in particular an ES or a PES within the meaning of the MPEG standard.

Another advantage of this method resides in the fact that it allows fast synchronization of the frames and therefore synchronization with a small wait when passing from one stream to another stream (for example when passing from a stream received in real time to a stream read on a hard disk or vice versa, or when passing from a stream received live to another stream received live) or when performing forward or backward skips in the stream. The sequences of frames are consequently almost unaltered by the synchronization process.

The successively presented frames may thus belong to distinct data streams or to distinct portions of one and the same data stream. In particular, the successively presented frames may be generated from:

data streams broadcast in real time, in one or more transport streams within the meaning of the MPEG standard;

data streams read on a mass recording digital medium and corresponding to distinct respective programs;

disjoint portions of a data stream corresponding to one and the same program which is read on a mass recording digital medium, which portions are intended to be presented at possibly different speeds of presentation and in a possibly different direction (forwards or backwards); and a stream received in real time and then another stream read on a mass recording digital medium, or vice versa.

When successive frame sequences are intended to be presented at different respective speeds of presentation (for frames produced from a data stream read on a mass recording digital medium), the local reference clock exhibits different respective tick rates for each of these frame sequences.

The process applies equally well to a data stream received in real time as to a data stream read from a mass recording digital medium. When the frames presented are produced from a data stream received in real time, the time-and-date-stamped instants defined by the local reference clock may advantageously be obtained directly from the PCRs forwarded by the transmission source within the data stream.

The method of this embodiment of the present invention can be implemented in response to a command of presentation start.

According to one embodiment, a value of deviation between a presentation instant indicated by a presentation time stamp and the corresponding time indicated by the local reference clock is stored in the register only if this value of deviation is non-zero. The register then contains only deviation values corresponding to defects of synchronization of the stream of frames presented. When the deviation value is zero, the deviation value previously stored in the register is selected as new value of reference deviation.

Preferably, when a new value of reference deviation is selected, all the deviation values contained in the register are erased. In this case, the set of deviation values taken into account for the variance calculation or for the average calculation corresponds to all the deviation values stored in the register at the moment of the calculation. A register of reduced capacity is then sufficient.

Furthermore, after the storing in the register of the value of deviation corresponding to the time stamp undergoing processing, the processing of this time stamp may be interrupted if the register contains a number of values of deviation less than a determined number. The introduction of such a threshold makes it possible to take into account a minimum duration of confirmation of a frame synchronization defect before modifying the tick rate of the local reference clock. This arrangement further reduces the user-visible or user-audible artifacts by avoiding inopportune resynchronizations.

Another embodiment of the present invention provides a method for synchronizing the presentation of video frames and the presentation of audio frames for the presentation in parallel of the video frames and the audio frames. The method includes the following steps. The presentation of the video frames is synchronized according to a process according to the first aspect, and parallel therewith, the presentation of the audio frames is synchronized according to a process according to the first aspect. A local reference clock associated with the presentation of the video frames and a local reference clock associated with the presentation of the audio frames are mutually synchronized by locking a first of these local reference clocks to the other.

The expression "parallel therewith" means a synchronization of the presentation of the video frames and a synchronization of the presentation of the audio frames carried out simultaneously by distinct pathways. In particular, certain at least of the means used to synchronize the presentation of the video frames are distinct from those used to synchronize the presentation of the audio frames.

Thus, the presentations of the video and audio frames are initially synchronized independently of one another, and are then subsequently synchronized with one another. Such a process makes it possible to take into account constraints and/or requirements specific to frames of each type, while guaranteeing a start of presentation of the frames of each type whose throughput is regulated right from the beginning of presentation.

A third aspect of the present invention relates to a device for implementing a process according to the first or the second aspect.

A fourth aspect of the present invention relates to a video driver circuit comprising a device according to the third aspect.

A fifth aspect relates to a decoder box ("set-top box") comprising a circuit according to the fourth aspect.

Other objects, features and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Figure 1:
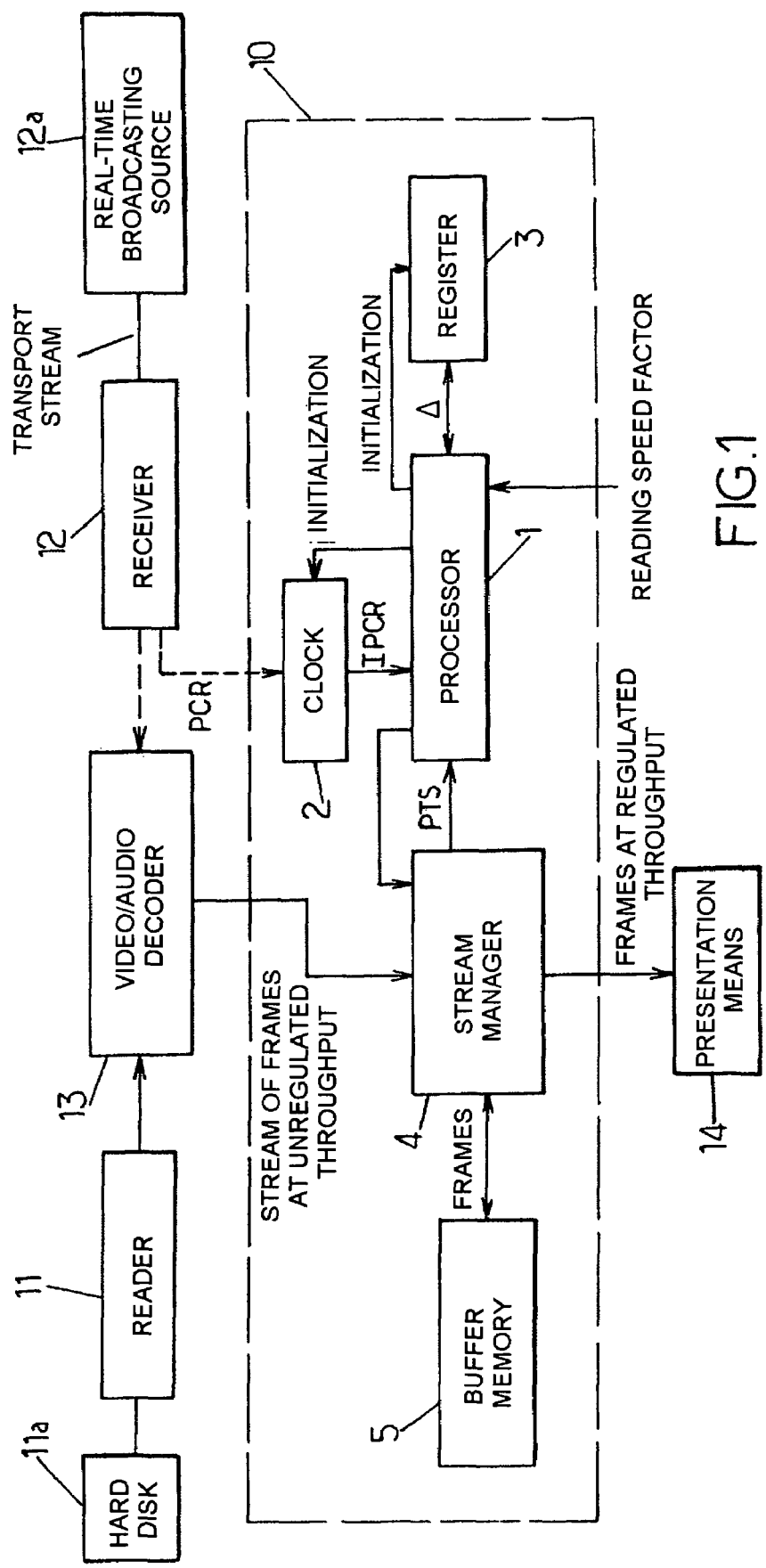
FIG. 1 is a diagram of a device for implementing a process according to a first embodiment of the present invention.
Figure 2:
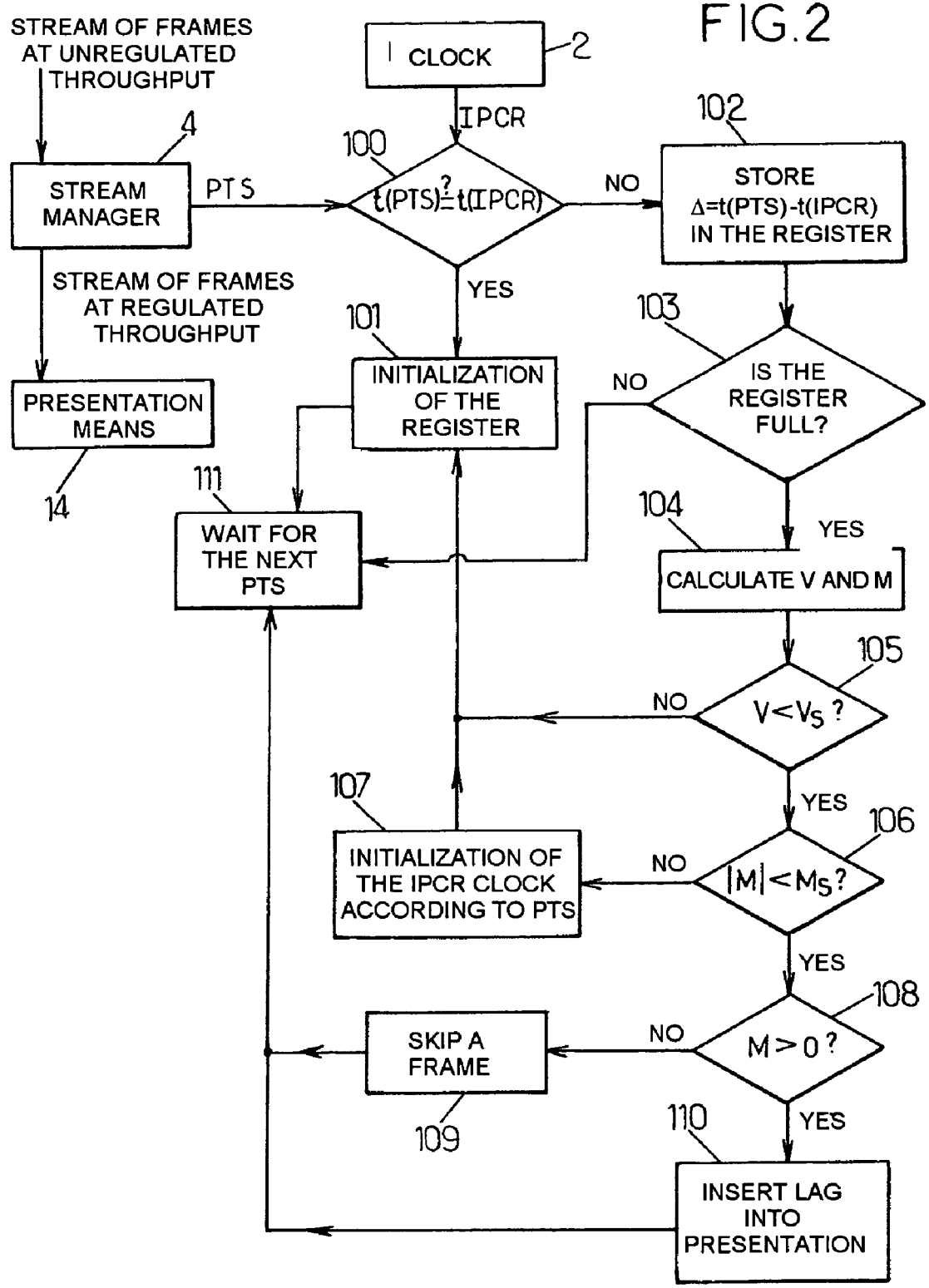
FIG. 2 is a flowchart of a process according to a preferred embodiment of the present invention.

In FIGS. 1 and 2, the frames supplied to a presentation means are video frames (such a frame corresponding to an image to be displayed) or audio frames (such a frame corresponding to the sound associated with an image).

FIG. 1 shows a frame regulator device 10 suitable for implementing a synchronization process according to a first embodiment of the present invention. The regulator 10 comprises in particular a processor 1, a local reference clock 2 and a frames throughput (or stream) manager 4.

The clock 2 is implemented in the form of a counter, the tick rate of the clock (that is to say the counting tempo of the counter) being for example equal to 90 kHz (kilo-hertz) for a nominal reading speed (×1). The tick rate can be increased or reduced for fast forwarding or slow motion, by applying a reading speed factor at the command of the counter.

The manager 4 receives as input a stream of frames with unregulated throughput sent by a video/audio decoder 13. At the output, the manager 4 sends the stream of frames with regulated throughput to presentation means 14. The presentation means comprises a display screen (for the video) or one or more loudspeakers (for the audio), and is provided with an input to which the frames are supplied in a continuous or quasi-continuous manner. The decoder 13 produces a stream of frames with unregulated throughput from data supplied by a reader 11 whose function is to read data from a mass recording digital medium 11a or, possibly, by a receiver 12. The receiver 12 receives from a real-time broadcasting source 12a a transport stream broadcast by satellite, by cable, or by digital terrestrial broadcasting. This transport stream comprises in multiplexed form the video, audio or other data from one or more programs. The receiver 12 performs the demultiplexing of this transport stream. Furthermore, it may possibly execute other functions such as, for example, descrambling, access control, etc. The decoder 13 can successively decode data streams received from the reader 11 and from the receiver 12, or vice versa.

The manager 4 is furthermore linked to a buffer memory 5 intended for temporarily storing certain frames before delivering them to be presented. This buffering of the frames renders the throughput of the frames delivered to the presentation means 14 independent of the throughput of the frames received from the decoder 13.

The processor 1 can access digital data stored in a memory register 3. A limited storage capacity of the register 3, corresponding for example to a maximum of 16 or 32 simultaneously stored digital values, may be sufficient for the implementation of the process of this embodiment of the present invention. Such a register of limited capacity is compatible with a high operating speed. The register 3 is controlled by the processor 1 so as to store in a chronological order temporal deviation values calculated by the processor 1. The processor 1 may furthermore command an instantaneous reinitialization of all the digital data contained in the register 3. The expression "reinitialization of the register 3" means an operation whereby the processor 1 erases all the, deviation values contained in the register 3.

The processor 1 can thus receive a reading speed factor, from outside the device 10, so as to take account of a command to read at accelerated or reduced speed relative to the nominal speed.

The clock 2 possesses a reference tick rate and supplies the processor 1 with temporal references at regular intervals. The clock 2 is called the local reference clock because it can operate without any outside temporal reference. The temporal references that it supplies, hereinbelow called the IPCRs ("Internal Program Clock References"), identify the time with respect to an instant of initialization of the clock 2. Such initialization of the clock 2 is commanded by the processor 1 upon the supplying of a frame to the presentation means 14.

The receiver 12 receives time references transmitted by the source 12a, which are the PCRs presented above. When the decoder 13 processes a data stream received from the receiver 12, the IPCRs are preferably based on the PCRs transmitted by the source 12a. In an example, the PCRs directly constitute the IPCRs. The clock 2 then does nothing other than synchronize itself with the PCRs received, in a known manner known, for example by means of a PLL ("Phase Locked Loop").

The data stream received by the decoder moreover comprises presentation time stamps, which are the PTSs presented above. These PTSs are found in the stream of frames with unregulated throughput which is transmitted to the manager 4. When the manager 4 detects a PTS in the stream of frames that it receives, it informs the processor 1. In return, the processor 1 can transmit commands for regulating the stream of frames to the manager 4.

FIG. 2 is a flowchart illustrating a process for regulating a stream of video or audio frames according to a preferred embodiment of the present invention. This process may be implemented by the device of FIG. 1.

When the manager 4 detects a PTS, it transmits the presentation instant t(PTS) indicated by this PTS to the processor 1. In step 100 (FIG. 2), the processor 1 compares this instant t(PTS) with the time identified by the last IPCR received from the clock 2, designated t(IPCR) in what follows and in the figure. If the instant t(PTS) is equal to the time t(IPCR), this signifies that the transmission of the frames to the presentation means 14 is synchronized with the clock 2. The register 3 is then reinitialized (step 101) and the processor 1 waits for the manager 4 to detect a next PTS in the stream of signals (step 111). The process is then repeated for the processing of the next PTS.

If the instant t(PTS) is different from the time t(IPCR), this signifies that the transmission of the frames to the presentation means 14 is not synchronized with the clock 2. The processor 1 then calculates the value Δ of the deviation between the instant t(PTS) and the time t(IPCR). In an example, Δ is equal to the value of t(PTS) from which is deducted the value of t (IPCR). If Δ is positive, this signifies that the presentation of the frame is in advance with respect to the tick rate of the clock 2. Conversely, if Δ is negative, this signifies that the presentation of the frame is delayed with respect to this tick rate. The value Δ is stored in the register 3 (step 102).

The processor 1 then examines whether the register 3 contains a specified number of stored values of deviations (step 103), for example 16 values. If this number of values of deviations is not reached, the processor 1 waits for the manager 4 to detect a next PTS in the stream of frames (step 111).

When the register 3 contains the specified number of deviation values, the processor 1 calculates a variance V and an average M from the set of deviation values contained in the register 3 (step 104). The variance V can be one of the types known in the field of statistics, such as the sum of the squares of the differences between each deviation value stored in the register 3 and an average of the deviation values, or such as the largest of these differences considered as absolute values. The average M can for example be calculated as the sum of the deviation values stored in the register 3, divided by the number of these deviation values.

The processor 1 then compares the calculated variance V with a predefined variance threshold $V_S$ (step 105). The threshold $V_S$ may depend on the type of frames (video or audio).

If the variance V is greater than $V_S$, this indicates an abrupt and considerable variation of the throughput of the frames received from the decoder 13 by the stream manager 4. In one preferred embodiment, the processor 1 waits for such a variation to be confirmed over several PTSs. During this wait, the processor 1 does not command any change in the presentation of the frames. It commands a reinitialization of the register 3 (step 101) and waits for the manager 4 to detect a next PTS in the data stream (step 111). The abrupt and considerable nature of the afore the variation is then confirmed if, for the subsequent PTS markers, a new value of the variance V is obtained which is small.

Conversely, if the variance V is less than $V_S$, this signifies that the throughput of the stream of frames received from the decoder 13 is stable. The processor 1 then compares the average M with an average threshold $M_S$ (step 106). The threshold $M_S$ may also depend on the type of frames.

If the value of the average M is greater, in absolute value, than the threshold $M_S$, this signifies that there is a systematic shift, over several PTSs, of the transmission of the frames to the means 14 with respect to the tick rate of the clock 2. Such a shift is then corrected by the processor 1 by commanding a reinitialization of the clock 2 with the instant t(PTS) (step 107). The register 3 is then reinitialized (step 101) and the next PTS is awaited (step 111).

Conversely, if the absolute value of the average M is non-zero but less than the threshold $M_S$, this signifies that there is a small instantaneous shift of the frames received from the decoder 13 with respect to the tick rate of the clock 2. In this case, the shift is compensated by the processor 1 by commanding an adjustment of the delivery of the frames to the means 14. The processor 1 then sends a command to the manager 4 so that it modifies the stream of frames in such a way as to regulate its throughput. The expression "regulation of the throughput of the stream of frames" means the act of contriving matters such that the presentation occurs substantially in synchronism with the time t(IPCR) of the clock 2. The regulating of the stream of signals transmitted to the screen 14 is achieved in the following manner, by testing the sign, positive or negative, of the average M (step 108).

When the average M is negative, thereby signifying a delay of frames with respect to the tick rate of the clock 2, the processor 1 orders the manager 4 to skip at least one frame (step 109). The stream of frames transmitted to the means 14 is then continued, being synchronized with the clock 2.

Conversely, when the average M is positive, this signifying an advance of the frames with respect to the tick rate of the clock 2, the processor 1 orders the manager 4 to introduce a lag into the delivery of the frames to the means 14 (step 110). Concerning the video, this lag may be obtained by ordering the manager 4 to repeat one or more video frames, one or more times. Concerning the audio, the processor 1 can order the manager 4 to wait for a specified duration between the delivery of two audio frames, so as to compensate for the advance of the stream of frames. The stream of frames transmitted to the means 14 is then continued, being synchronized with the clock 2.

The synchronization process described hereinabove implements a particular management of the content of the register 3, proceeding by repeated initializations of the register 3. Such management makes it possible to use a register 3 of limited capacity. It is given here by way of example, it being understood that other equivalent modes of management may be used alternatively.

The synchronization process of the present invention makes it possible to present frames automatically and without discontinuity even when these frames belong to different programs (having different respective program clocks), or to discontinuous portions of the data stream received by the decoder 13 (in the case of reading in trick mode from the medium 13a). It also allows the smooth insertion of an advertisement during the presentation of a program ("seamless splicing"). By way of example, an advertising sequence may thus be inserted during the presentation of a film, by interrupting the presentation of the film for the duration of the advertising sequence, then by coming back to the presentation of the film, with no lag following the advertising sequence.

The synchronization process of the present invention can also be implemented at the start of the presentation of frames. In this case, an intermediate step can be included between the reception of a command of presentation start and the previously described processing of the PTSs of a first sequence of frames. This intermediate step can in particular comprise an initialization of the clock 2 to an instantaneous value corresponding to the instant t(PTS) indicated by the first PTS detected by the stream manager 4. This allows immediate synchronization right from the first PTS of the sequence.

The intermediate step can also comprise a recording in the buffer memory 5 of first frames intended to be presented. These frames available in the buffer memory 5 can correspond to an advance of the stream of frames delivered by the decoder 13, with respect to the actual presentation of the frames on the means 14. Such an advance may make it possible to compensate for a subsequent slowing of the stream of frames delivered by the decoder 13.

The process of the present invention can also be used to mutually synchronize the respective presentations of two distinct streams of frames. The two streams of frames are for example a stream of video frames and a stream of audio frames of one and the same program.

Figure 3:
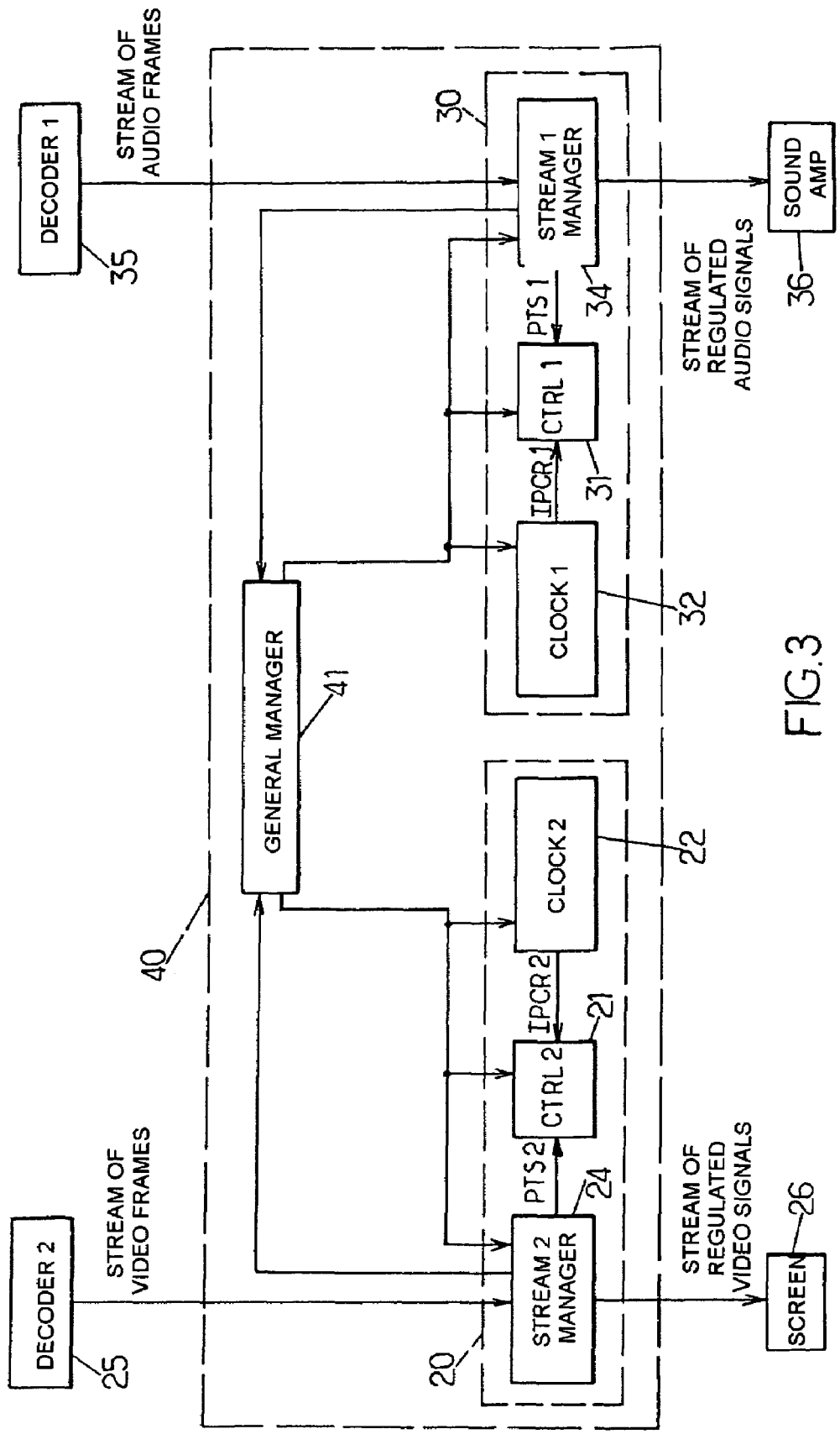
FIG. 3 is a diagram of a device for implementing a process according to a second embodiment of the present invention.

FIG. 3 is a diagram of a device for implementing a process according to a second embodiment of the present invention. FIG. 3 diagrammatically represents a device 40 receiving both a stream of video frames and a stream of audio frames, for example produced respectively by a video decoder 25 (decoder 2) and by an audio decoder 35 (decoder 1). Typically, the decoders 25 and 35 are contained within one and the same circuit corresponding to the video/audio decoder 13 of FIG. 1.

In general, the audio decoding is faster than the video decoding, thus making it necessary for the video frames transmitted to a display system 26 to be synchronized with the audio frames sent to an amplifier 36 feeding a set of loudspeakers. This synchronization is performed at the moment of presentation of the video frames and of the audio frames respectively to the display system 26 and to the amplifier 36.

To do this, a general stream regulator device 40 comprises a first secondary stream regulator device 20 operating on the stream of video frames emanating from the video decoder 25, and a second secondary stream regulator device 30 operating on the stream of audio frames emanating from the audio decoder 35. The secondary regulators 20 and 30 are independent from one another and respectively deliver a stream of video frames at regulated throughput to the display system 26 and a stream of audio frames at regulated throughput to the amplifier 36.

In this embodiment, the secondary regulators 20 and 30 each possess a structure identical to that of the regulator 10 presented hereinabove with respect to the diagram of FIG. 1. In particular, they each comprise a processor 21 and 31 respectively (CTRL2 and CTRL1 respectively in FIG. 3), a clock 22 and 32 respectively (clocks 2 and 1 respectively) and a stream manager 24 and 34 respectively (stream managers 2 and 1 respectively). For the sake of simplicity, only these elements are represented in FIG. 3.

The general regulator 40 furthermore comprises a general manager 41 which can send commands to the various elements of the secondary regulators 20 and 30. The tick rates of the two clocks 22 and 32 are identical, for example equal to 90 kHz (multiplied by the respectively video and audio reading speed factor).

The manager 24 detects PTSs in the stream of video frames (here denoted PTS2), and indicates the instants corresponding to these PTSs (instants t(PTS2)) to the processor 21. The clock 22 indicates an instant corresponding to the detection of each PTS and indicates this instant, designated by t(IPCR2), to the processor 21.

Likewise, the manager of the audio stream 34 detects PTSs (denoted PTS1 in the figure) in the stream of audio frames, and indicates to the processor 31 the instants t(PTS1) corresponding to these PTSs. The clock 32 indicates to the processor 31 the instants t(IPCR1) corresponding to the detection of each PTS. The instants t(PTS1) are a priori independent of the instants t(IPCR2).

Preferably, the regulator 40 sustains a third clock which is the program clock generated or recovered from the PTSs.

Following a command of presentation start received by the general manager 41, the presentation of the frames of the two streams, video and audio, is begun.

The presentation of the stream of audio frames is initiated in the manner described in conjunction with FIGS. 1 and 2, using the corresponding instants t(PTS1) and t (IPCR1). Simultaneously, and independently, the presentation of the stream of video frames is initiated using the corresponding instants t(PTS2) and t(IPCR2).

Optionally, the clock 32 (respectively 22) may be initialized at the instant t(PTS1) (respectively t(PTS2)) of the first PTS detected by the stream manager 34 (respectively 24). The stream manager 34 (respectively 24) then delivers to the amplifier 36 (respectively to the screen 26) a stream of audio (respectively video) frames at regulated throughput, synchronized with the clock 32.

Between the reception of the start of presentation command by the general manager 41 and the start of the supplying of the audio (respectively video) frames to the amplifier 36 (respectively to the display device 26), the first audio (respectively video) frames of the program are stored in a buffer memory by the stream manager 34 (respectively 24). Such a buffer memory corresponds to the buffer memory 5 of FIG. 1. When this buffer memory is full, the stream manager 34 (respectively 24) commences the transmission of the audio (respectively video) frames to the amplifier 36 (respectively to the display device 26) in the form of a stream at regulated throughput synchronized with the clock 32 (respectively 22).

The video and audio frame streams presented then each have a regulated throughput, but are not necessarily synchronized with respect to one another. For example, the audio frames may be in advance with respect to the video frames. The two clocks 22 and 32 have each been initialized at least once to instantaneous values corresponding to instants t(PTS2) or t(PTS1) respectively, having been so independently of one another.

To obtain this mutual synchronization (that is to say synchronization between one another) of the stream of video frames and the stream of audio frames, the general manager 41 orders a locking of the clock 32 to the instantaneous time indicated by the clock 22. This locking can advantageously be performed by an initialization of the clock 32 to the time indicated by the clock 22 whenever an initialization of the clock 22 is ordered by application of the process described hereinabove with regard to the diagram of FIG. 2.

Even before the initialization of the clock 32 to the time indicated by the clock 22, the two clocks 22 and 32 in principle indicate respective times which are close to one another on the basis of information (namely the PTSs respectively PTS2 and PTS1) originating from the same stream of data (hence tied to the same program clock) since each of the streams of video frames and audio frames forms the subject of an independent synchronization. Stated otherwise, the clocks 22 and 32 are in principle diasynchronous.

Optionally, the general manager 41 can delay the afore the initialization as long as the times respectively indicated by the two clocks 22 and 32 do not exhibit a deviation less than a specified threshold. Such additional condition makes it possible to guarantee that the stream of audio frames does not of itself undergo any considerable alteration due to overly frequent synchronizations with the stream of video frames.

Likewise, the general manager 41 does not order the afore the initialization unless the reading speed factors of each of the clocks 22 and 32 are equal. The factors might not be equal, fleetingly, just after the receipt of a command for modifying the program reading speed, since this command does not affect each of the streams of video and audio frames with the same alacrity.

On the basis of this initialization of the clock 32 with the time indicated by the clock 22, the two clocks 22 and 32 are mutually synchronized by the general manager 41 and deliver a common time. Stated otherwise, t(IPCR1)=t (IPCR2). More particularly, in the example described hereinabove, the clock 32 reproduces at each instant the time delivered by the clock 22. The delivery of the video frames is then continued in accordance with the process described hereinabove with reference to the diagram of FIG. 2. According to this process, the clock 22 can be initialized depending on the PTSs of the stream of video frames. The thus obtained synchronization of the video frames causes only reduced alterations of the stream of video frames.

The delivery of the audio frames by the stream manager 34 is also continued, but in a manner slaved to the clock 22 associated with the video frames. The synchronization process used for the audio signals corresponds to the process described with reference to FIG. 2, in which the step 106 of comparing the absolute value of the average M with an average threshold is omitted, as is step 107. Step 105, when the test of variance is positive, then leads systematically to step 108.

The thus obtained delivery of the audio signals follows the initializations of the clock 22 which are caused by the synchronization of the presentation of the video frames. The stream of audio frames is thus synchronized with respect to the stream of video frames. This synchronization proceeds only through skips of audio frames or through the introduction of waiting lags into the stream of audio frames. It results therefrom in particular that the stream of audio frames at regulated throughput delivered to the amplifier 36 may exhibit more considerable alterations than the stream of video frames delivered to the display device 26. This is why the mutual synchronization of the two streams is performed with a priority accorded to the stream of video frames. Such a manner of operation is appropriate when one considers that a user has a perception of the irregularities of the audio stream which is inferior to that associated with the video stream.

In another embodiment of the process of mutual synchronization of the streams of video and audio frames, the priority may be accorded to the stream of audio frames. In this case, the clock 22 reproduces the time indicated by the clock 32.

Optionally, priority may be allocated to one or the other of the two streams depending on specified circumstances or depending on a corresponding command input by the user. The priority may then be allocated by the general manager 41.

Provision may be made for the mutual synchronization process described hereinabove to be reversible. If the two clocks 22 and 23 are locked, the main manager 41 can then unlock them when one of the stream managers 24 or 34 (which continue to operate independently from one another despite the locking of one of the clocks 22 or 32 which is imposed by the main manager 41) requires an initialization of the clock 22 or 32 respectively because of a deviation greater than the specified threshold. Specifically, such a deviation signifies that there is a considerable shift between the two clocks 22 and 32, that requires that they be dissociated. This may occur when a discontinuity of the stream of video frames or of the stream of audio frames occurs without immediate counterpart on the other stream (for example upon a change of the speed and/or the direction of reading, or a change of the origin of the frames).

When the program is read at high speed, so that the regulators 20 and 30 may not process accurately, the following measures enable the mutual synchronization between the clocks 22 and 32 to be best preserved.

The regulator 20 (video) can issue a command to the decoder 25 to skip portions of data in the compressed data stream. In return, the decoder informs it of the existence of a discontinuity. In this case, instead of aiming at preserving the synchronization, it immediately reinitializes the clock 22. When the two clocks are locked, the audio is thus immediately informed of the new reference.

The regulator 30 (audio) applies the same procedure in a reciprocal manner. Moreover, if the audio comes to be greatly delayed with respect to the video, the regulator 30 can also issue a command to the decoder 35 to skip a portion of the stream of audio data, or else to skip the audio frames one by one. In this case, the size in bytes of the skip required is determined by multiplying the number of audio frames to be skipped by the binary throughput of the stream of audio data. The number of frames to be skipped is determined as a function of the deviation between the current PTS and the current PTR.

The present invention can be implemented in hardware, software, or a combination of hardware and software. Any processor, controller, or other apparatus adapted for carrying out the functionality described herein is suitable. A typical combination of hardware and software could include a general purpose microprocessor (or controller) with a computer program that, when loaded and executed, carries out the functionality described herein.

The present invention can also be embedded in a computer program product, which comprises all the features enabling the implementation of the methods described herein, and which—when loaded in an information processing system—is able to carry out these methods. Computer program means or computer program in the present context mean any expression, in any language, code or notation, of a set of instructions intended to cause a system having an information processing capability to perform a particular function either directly or after either or both of the following a) conversion to another language. Such a computer program can be stored on a computer or machine readable medium allowing data, instructions, messages or message packets, and other machine readable information to be read from the medium. The computer or machine readable medium may include non-volatile memory, such as ROM, Flash memory, Disk drive memory, CD-ROM, and other permanent storage. Additionally, a computer or machine readable medium may include, for example, volatile storage such as RAM, buffers, cache memory, and network circuits. Furthermore, the computer or machine readable medium may comprise computer or machine readable information in a transitory state medium such as a network link and/or a network interface, including a wired network or a wireless network, that allow a device to read such computer or machine readable information.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A method for synchronizing the presentation of video frames and/or audio frames generated by processing a data stream comprising time stamps indicating instants of presentation of the frames, the method comprising the steps of:

calculating a current value of deviation between the presentation instant indicated by a time stamp undergoing processing and a time indicated by a local reference clock during the processing of the time stamp;

storing the current value of deviation in a register following values of deviation corresponding to previously processed time stamps;

calculating a variance of an ordered set of deviation values stored in the register coming after a reference deviation value, the set of deviation values comprising at least the current value of deviation, and comparing the variance with a predetermined variance threshold;

if the variance is greater than the variance threshold, selecting the current value of deviation as new value of reference deviation; and if the variance is less than the variance threshold, calculating an average of the deviation values of the set of deviation values and comparing the average with a determined average threshold, and if the absolute value of the average is greater than the average threshold, initializing the local reference clock to an instantaneous value corresponding to the presentation instant indicated by the time stamp undergoing processing and the current value of deviation is selected as new value of reference deviation, or if the absolute value of the average is less than the average threshold, adjusting the presentation of the frames in such a way as to reduce the deviation between the presentation instant indicated by the time stamp undergoing processing and the time indicated by the local reference clock during the processing of the time stamp.

2. The method according to claim 1, wherein the adjustment of the presentation of the frames comprises:

when the average of the deviation values of the set of deviation values is negative, skipping at least one frame.

3. The method according to claim 1, wherein the adjustment of the presentation of the frames comprises:

when the average of the deviations of the set of deviations is positive, introducing a timeout into the presentation of the frames.

4. The method according to claim 1, wherein the current value of deviation is stored in the register only if the value of deviation is non-zero, and the deviation value previously stored in the register is selected if the deviation value is zero.

5. The method according to claim 1, wherein, when a new value of reference deviation is selected, all the deviation values contained in the register are erased, and the set of deviation values taken into account for the variance calculation and for the average calculation corresponds to all the deviation values stored in the register at the moment of the calculation.

6. The method according to claim 5, wherein, after the storing in the register of the current value of deviation, the processing of the time stamp is interrupted if the register contains a number of values of deviation less than a determined number.

7. The method according to claim 1, further comprising, in response to a command of presentation start and before the start of the processing of the time stamps, initializing the local reference clock to an instantaneous value corresponding to the presentation instant indicated by the first time stamp to be processed.

8. The method according to claim 7, further comprising commencing from the receipt of the command of presentation start a recording in a buffer memory of the frames received.

9. The method according to claim 1, wherein the data stream is read from a mass recording digital medium.

10. The method according to claim 1, wherein the data stream is received in real time from a real-time broadcasting source.

11. The method according to claim 10, wherein the tick rate of the local reference clock is synchronized with time references contained in the data stream received.

12. A method for synchronizing presentation of video frames and presentation of audio frames for a presentation in parallel of the video frames and the audio frames, the method comprising the steps of:

synchronizing the presentation of the video frames according to the process according to claim 1;

parallel therewith, synchronizing the presentation of the audio frames according to the process according to claim 1; and mutually synchronizing a local reference clock associated with the presentation of the video frames and a local reference clock associated with the presentation of the audio frames by locking a first of these local reference clocks to the other of these local reference clocks.

13. The method according to claim 12, wherein the locking is obtained by on each occasion initializing the first local reference clock to the instantaneous value of the other local reference clock.

14. The method according to claim 12, wherein the local reference clock is initialized to the instantaneous value of the other local reference clock only if the times indicated by each of the two respective local reference clocks exhibit, at a given instant, a deviation less than a determined threshold.

15. A device for synchronizing the presentation of video frames and/or of audio frames generated by processing a data stream comprising time stamps indicating instants of presentation of the frames, the device comprising:

means for calculating a current value of deviation between the presentation instant indicated by a time stamp undergoing processing and a time indicated by a local reference clock during the processing of the time stamp;

means for storing the current value of deviation in a register following values of deviation corresponding to previously processed time stamps;

means for calculating a variance of an ordered set of deviation values stored in the register coming after a reference deviation value, the set of deviation values comprising at least the current value of deviation;

means for comparing the variance with a determined variance threshold;

means for selecting the current value of deviation as new value of reference deviation if the variance is greater than the variance threshold;

means for calculating an average of the deviation values of the set of deviation values if the variance is less than the variance threshold;

means for comparing the average with a determined average threshold;

means for initializing the local reference clock to an instantaneous value corresponding to the presentation instant indicated by the time stamp undergoing processing and for selecting the current value of deviation as new value of reference deviation, if the absolute value of the average is greater than the average threshold; and means for adjusting the presentation of the frames in such a way as to reduce the deviation between the presentation instant indicated by the time stamp undergoing processing and the time indicated by the local reference clock during the processing of the time stamp, if the absolute value of the average is less than the average threshold.

16. A video driver circuit comprising the device according to claim 15.

17. A decoder box comprising a video driver circuit according to claim 16.

18. A machine-readable medium encoded with a program for synchronizing the presentation of video frames and/or audio frames generated by processing a data stream comprising time stamps indicating instants of presentation of the frames, said program containing instructions for performing the steps of:

calculating a current value of deviation between the presentation instant indicated by a time stamp undergoing processing and a time indicated by a local reference clock during the processing of the time stamp;

storing the current value of deviation in a register following values of deviation corresponding to previously processed time stamps;

calculating a variance of an ordered set of deviation values stored in the register coming after a reference deviation value, the set of deviation values comprising at least the current value of deviation, and comparing the variance with a predetermined variance threshold;

if the variance is greater than the variance threshold, selecting the current value of deviation as new value of reference deviation; and if the variance is less than the variance threshold, calculating an average of the deviation values of the set of deviation values and comparing the average with a determined average threshold, and if the absolute value of the average is greater than the average threshold, initializing the local reference clock to an instantaneous value corresponding to the presentation instant indicated by the time stamp undergoing processing and the current value of deviation is selected as new value of reference deviation, or if the absolute value of the average is less than the average threshold, adjusting the presentation of the frames in such a way as to reduce the deviation between the presentation instant indicated by the time stamp undergoing processing and the time indicated by the local reference clock during the processing of the time stamp.

19. The machine-readable medium according to claim 18, wherein the adjustment of the presentation of the frames comprises:

when the average of the deviation values of the set of deviation values is negative, skipping at least one frame.

20. The machine-readable medium according to claim 18, wherein the adjustment of the presentation of the frames comprises:

when the average of the deviations of the set of deviations is positive, introducing a timeout into the presentation of the frames.

* * * * *